(12) United States Patent
Cordery et al.

(10) Patent No.: US 8,041,645 B2
(45) Date of Patent: *Oct. 18, 2011

(54) DOCUMENT SECURITY UTILIZING COLOR GRADIENTS

(75) Inventors: Robert A. Cordery, Danbury, CT (US); Donald G. Mackay, Roxbury, CT (US); Claude Zeller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1567 days.

This patent is subject to a terminal disclaimer.

(21) Appl. No.: 10/990,719

(22) Filed: Nov. 17, 2004

(65) Prior Publication Data

US 2005/0071295 A1 Mar. 31, 2005

Related U.S. Application Data

(63) Continuation-in-part of application No. 10/819,700, filed on Apr. 7, 2004, now Pat. No. 7,055,746, which is a continuation-in-part of application No. 10/645,376, filed on Aug. 21, 2003, now Pat. No. 7,299,984.

(51) Int. Cl.
*G06Q 90/00* (2006.01)
*G06Q 99/00* (2006.01)
(52) U.S. Cl. ............ 705/62; 705/41; 705/405; 705/408; 705/410; 380/51
(58) Field of Classification Search .............. 705/60, 705/62, 401, 405, 408, 410; 380/51; 382/135; 434/110; 359/2; 902/7; 283/17
See application file for complete search history.

(56) References Cited

U.S. PATENT DOCUMENTS

| | | | | |
|---|---|---|---|---|
| 4,194,846 | A * | 3/1980 | Zerillo | 400/124.1 |
| 4,831,555 | A * | 5/1989 | Sansone et al. | 358/1.14 |
| 5,251,989 | A * | 10/1993 | Di Luco | 400/240.3 |
| 5,525,798 | A | 6/1996 | Berson et al. | |
| 6,039,257 | A | 3/2000 | Berson et al. | |
| 6,070,805 | A | 6/2000 | Kaufman et al. | |
| 6,108,643 | A * | 8/2000 | Sansone | 705/62 |
| 6,210,777 | B1 * | 4/2001 | Vermeulen et al. | 428/195.1 |
| 6,256,638 | B1 | 7/2001 | Dougherty et al. | |
| 6,324,004 | B1 * | 11/2001 | Staub et al. | 359/567 |
| 6,724,912 | B1 * | 4/2004 | Carr et al. | 382/100 |
| 2001/0005466 | A1 * | 6/2001 | Nishimura et al. | 400/578 |

OTHER PUBLICATIONS

"PhotoStamps Returns—Tighter Rules Aim to Prevent Use of 'Inappropriate' Images", news article from MadeForOne.com, May 6, 2005.*
"Handbook of Applied Cryptography", A. Menezes, P. van Oorschot, and S. Vanstone, CRC Press, 1996. Chapter 9 included with Action.*

(Continued)

*Primary Examiner* — James A Reagan
*Assistant Examiner* — Christopher C Johns
(74) *Attorney, Agent, or Firm* — Brian A. Collins; Charles R. Malandra, Jr.; Steven J. Shapiro

(57) ABSTRACT

The present invention includes apparatus and methods for printing and verifying postage stamps on demand via a personal postage stamp printer. The indicium by which the stamp is printed includes a color stripe and a data field including authentication data that corresponds to the color stripe. To authenticate the stamp, the authentication data in the data field is read and compared with authentication data extracted from the color stripe.

5 Claims, 7 Drawing Sheets

OTHER PUBLICATIONS

Internet Archive's Wayback Machine archive of "2-Dimensional Bar Code Page" (<http://www.adams1.com/pub/russadam/stack.html>), archived Jan. 24, 2002.*

Plotter. Microsoft Computer Dictionary, Fifth Edition. Microsoft Press, Redmond, WA, 2002. Front matter, back cover, and pp. 408-409 included.*

* cited by examiner

DOCUMENT SECURITY UTILIZING COLOR GRADIENTS

CROSS-REFERENCE TO RELATED APPLICATIONS

This application is a continuation-in-part of prior application Ser. No. 10/819,700 entitled "Postage Indicia Including Color Bar Sequence to Aid In Authentication" filed on Apr. 7, 2004, now U.S. Pat. No. 7,055,746 which is a continuation-in-part of prior application Ser. No. 10/645,376 entitled "Postage Indicia Including Encoded Ink Characteristic Data", filed. Aug. 21, 2003 now U.S. Pat. No. 7,299,984. Both of these prior applications are incorporated herein by reference in their entirety.

BACKGROUND

This invention relates generally to the field of document security, and more particularly to printing and reading of document components to safeguard and verify the authenticity of a document.

It has been proposed to provide postage stamp printing devices that may be used by postal patrons to print their own postage stamps. However, it is an important consideration that counterfeiting of such postage stamps be deterred. More generally, it is desirable to provide printed security elements that are suitable for deterring counterfeiting of a wide variety of documents.

SUMMARY

Accordingly, apparatus and methods for printing and inspecting machine-verifiable documents such as postage stamps are provided.

In one aspect, a method includes providing authentication data. The method further includes printing on a substrate a first representation of the authentication data, and printing on the substrate a second representation of the authentication data. The first representation includes a color region that represents the authentication data by a variation of at least one color component of the color region.

The variation may be substantially continuous, and may be periodic, such as sinusoidal. Both the first and second representations may be part of a postage meter indicium. As used herein, the term "postage meter indicium" should be understood to include, but not be limited to, a postage stamp printed by a personal postage stamp printer.

The substrate may be an envelope or a medium used for printing of postage stamps by a personal postage meter.

The first representation of the authentication data may be in the form of a color stripe. The second representation of the authentication data may be in the form of a barcode such as a two-dimensional barcode. The first and second representations may be printed on the substrate substantially simultaneously. More generally, the second representation of the authentication data may be in the form of any machine-readable symbology including a two-dimensional barcode, a one-dimensional barcode, or an OCR (optical character recognition) font.

In another aspect, a method of authenticating a document includes scanning at least a portion of the document. The method further includes analyzing a color region of the scanned portion of the document to detect first authentication data represented by a variation of at least one color component of the color region. The method also includes reading a second region of the scanned portion of the document to detect second authentication data. In addition, the method includes comparing the first and second authentication data.

The variation of the at least one color component may be substantially continuous, and may be periodic, such as sinusoidal. The document may be a postage meter indicium. The second region may include a barcode such as a two-dimensional barcode.

In still another aspect, a method includes scanning a color stripe and generating color gradient data indicative of at least one characteristic of a variation in intensity of at least one color component along the length of the color stripe.

The method may further include reading a barcode adjacent to the color stripe to generate barcode data, and comparing the barcode data with the color gradient data. The color stripe and the barcode may both be part of a postage meter indicium, and the comparing step may be for the purpose of authenticating the postage meter indicium. The barcode may be a two-dimensional barcode. The variation in intensity of the at least one color component may be a sinusoidal variation, and the at least one characteristic indicated by the color gradient data may be at least one of wavelength, amplitude and phase of the sinusoidal variation.

In another aspect, an apparatus includes a data mechanism for providing authentication data, and a printing mechanism for printing on a substrate a first representation of the authentication data and a second representation of the authentication data. The second representation includes a color region that represents the authentication data by a variation of at least one color component of the color region.

In still another aspect, an apparatus for authenticating a document includes a mechanism for scanning at least a portion of the document, a mechanism for analyzing a color region of the scanned portion of the document to detect first authentication data represented by a variation of at least one color component of the color region, a mechanism for reading a second region of the scanned portion of the document to detect second authentication data, and a mechanism for comparing the first and second authentication data.

In yet another aspect, a substrate (e.g., an envelope or an item of adhesive label stock) has printed thereon a first representation of authentication data and a second representation of authentication data. The second representation of the authentication data includes a color region that represents the authentication data by a variation of at least one color component of the color region.

In accordance with some aspects of the invention, postage indicia may be printed on adhesive label stock to form postage stamps. Each indicium may include a color stripe, which may vary from indicium to indicium. Variations such as gradients in one or more color components in the color stripe may be used to represent authentication data. Each indicium may also include another representation (e.g., in a two-dimensional barcode) of the authentication data. The authenticity of the indicium may be verified by scanning the indicium and then (e.g., automatically by machine) comparing the authentication data represented by the color stripe and by the other representation. Thus the presence of these elements in a postage indicium may help to deter counterfeiting. The color stripe may include subtle gradients that are not readily detectable or reproducible, to provide an additional layer of security.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes apparatus and methods for allowing a postal customer to print his or her own postage stamps. The stamps are printed using a personal postage stamp printer. The stamp printer prints on adhesive label stock. The postage indicium printed to form the stamp includes a color stripe. Variations such as color gradients in the color components of the color stripe represent authentication data. The postage indicium also includes another representation of the authentication data. This other representation of the authentication data may present the data in encoded (and possibly also encrypted) form in a two-dimensional barcode or in another form. The color stripe and the 2D barcode vary from stamp to stamp. The 2D barcode is downloaded to the postage stamp printer from an administrative server, which handles charging of the postage to the customer's account.

To verify the stamp, the stamp is scanned and machine analysis is performed to detect the color component variations along the color stripe and to read the authentication data encoded in the 2D barcode. If these two pieces of information match, the authenticity of the stamp may be considered to be verified.

Figure 1:
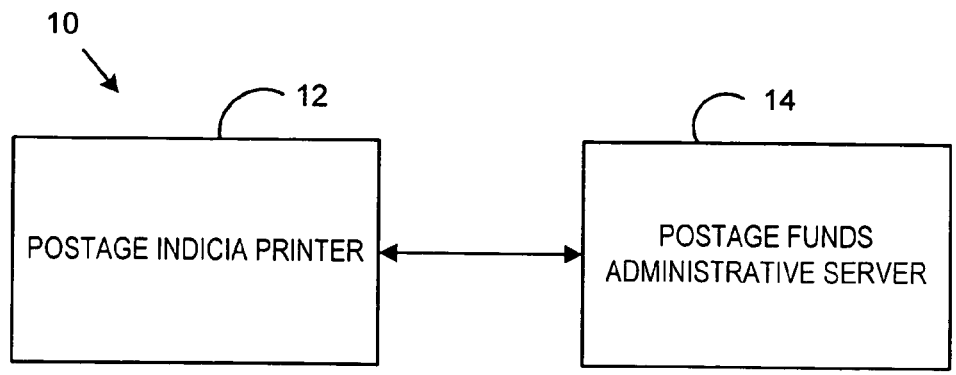
FIG. 1 is a block diagram that illustrates a consumer postage stamp printing apparatus arranged in accordance with principles of the present invention.

Referring now to the drawings, and particularly to FIG. 1, the reference numeral 10 indicates generally a postage stamp printing apparatus in accordance with principles of the present invention. The apparatus 10 includes a personal postage stamp printer 12 (hereinafter, "printer 12") shown in data communication with a postage funds administrative server 14. While the description of the preferred embodiment shows a particular division of steps in the process of creating an indicium employing color gradients, any other division of steps is within the scope of the invention. In one embodiment, the printer 12 may be a postage meter that can perform all the functionality. In another embodiment the printer 12 could provide the ability to format the barcode and/or the color stripe and receive only the security data from the administrative server 14.

Both the printer 12 and the server 14 will be described in more detail below, but their functions will now be generally described. The printer 12 prints postage stamps on demand by the postal customer that has possession of the printer. The printer may operate independently of the server to print a stamp while not connected to the server. The server 14 handles charging the customer's account for postage corresponding to stamps authorized to be printed by the printer 12. The server 14 also generates and downloads to the printer 12 security-related information to be included in the images printed to form the postage stamps.

The printer 12 may be in occasional data communication with the server 14 via, for example, a dial-up connection and/or the Internet.

Figure 2:
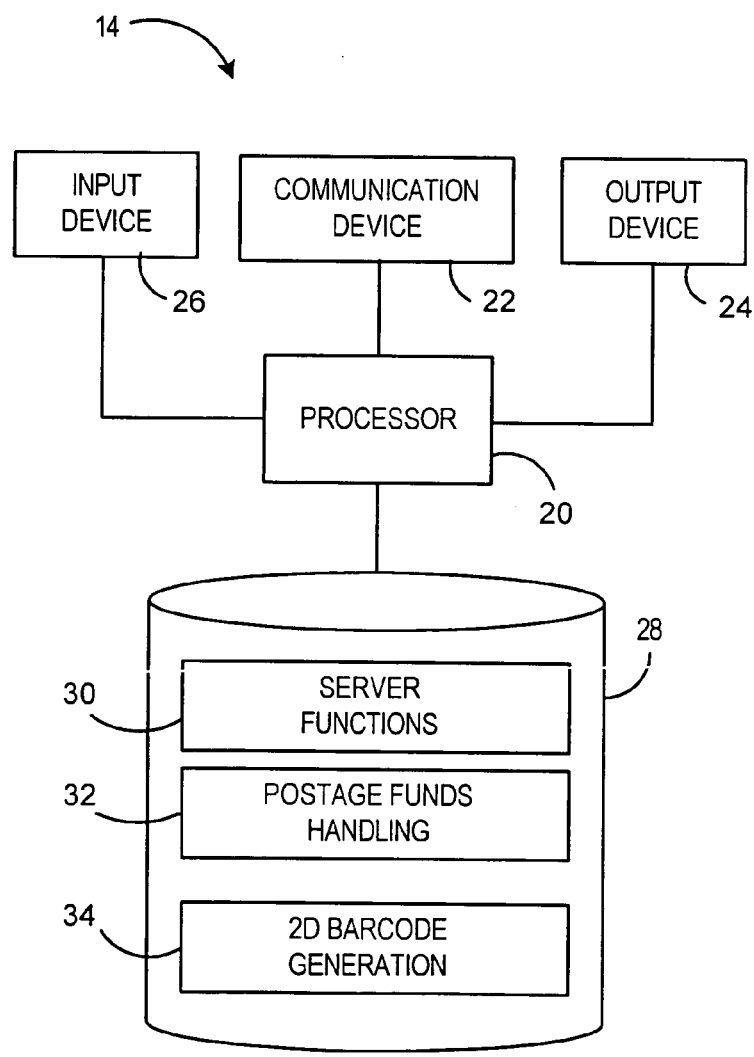
FIG. 2 is a block diagram that illustrates an administrative server that is part of the apparatus of FIG. 1.

FIG. 2 is a block diagram that illustrates an embodiment of the server 14 shown in FIG. 1. Generally, in some embodiments, the server 14, in its hardware aspects, may be constituted by conventional computer hardware. As seen from FIG. 2, the server 14 may include a processing unit 20. The processing unit 20 may be constituted by one or more processors of the type used in server computers, mainframe computers, minicomputers and/or desktop computers. The server 14 may also include a communication device 22 in communication with the processing unit 20. The communication device 22 may, for example, comprise one or more data communication ports by which the processing unit 20 may exchange data with the printer 12 (FIG. 1) and/or with other personal postage stamp printers. (Although only one printer is shown in FIG. 1, it should be understood that the server 14 may, at any one time or at various times, be in communication with a number, and potentially a large number, of different personal postage stamp printers.)

The server 14 may further include an output device 24 in communication with the processing unit 20 and an input device 26 in communication with the processing unit 20. The output device 24 may, for example, comprise one or more printers and/or one or more display monitors. The input device 26 may include conventional devices such as a keyboard and/or mouse or other pointing device. The input device 26 may be used by a human operator to control, administer, maintain or provide input to the server 14.

There may also be included in the server 14 a storage device 28 that is in communication with the processing unit 20. The storage device 28 may comprise, for example, a combination of magnetic, optical and/or semiconductor memory devices. In some embodiments, the storage device 28 may include one or more hard disk drives, RAM (random access memory), ROM and one or more drives for removable data storage media.

The storage device 28 may store a number of programs for controlling the processing unit 20. For example, the storage device 28 may store server functions software 30 that enables the server 14 to function as a host to client devices such as the above-mentioned personal postage stamp printers that may be in communication with the server 14 from time to time. (In an alternative embodiment, a personal computer may be connected to a personal stamp printer.)

The storage device 28 may also store postage funds handling software 32 that enables the server 14 to handle charges to customer accounts in respect of postage funds disbursed by printing of postage stamps authorized by the server 14.

The storage device 28 may further store software 34 that enables the server 14 to generate image data that corresponds to 2D barcodes to be printed by the personal postage stamp printers as part of the postage indicia that form the stamps.

Figure 3:
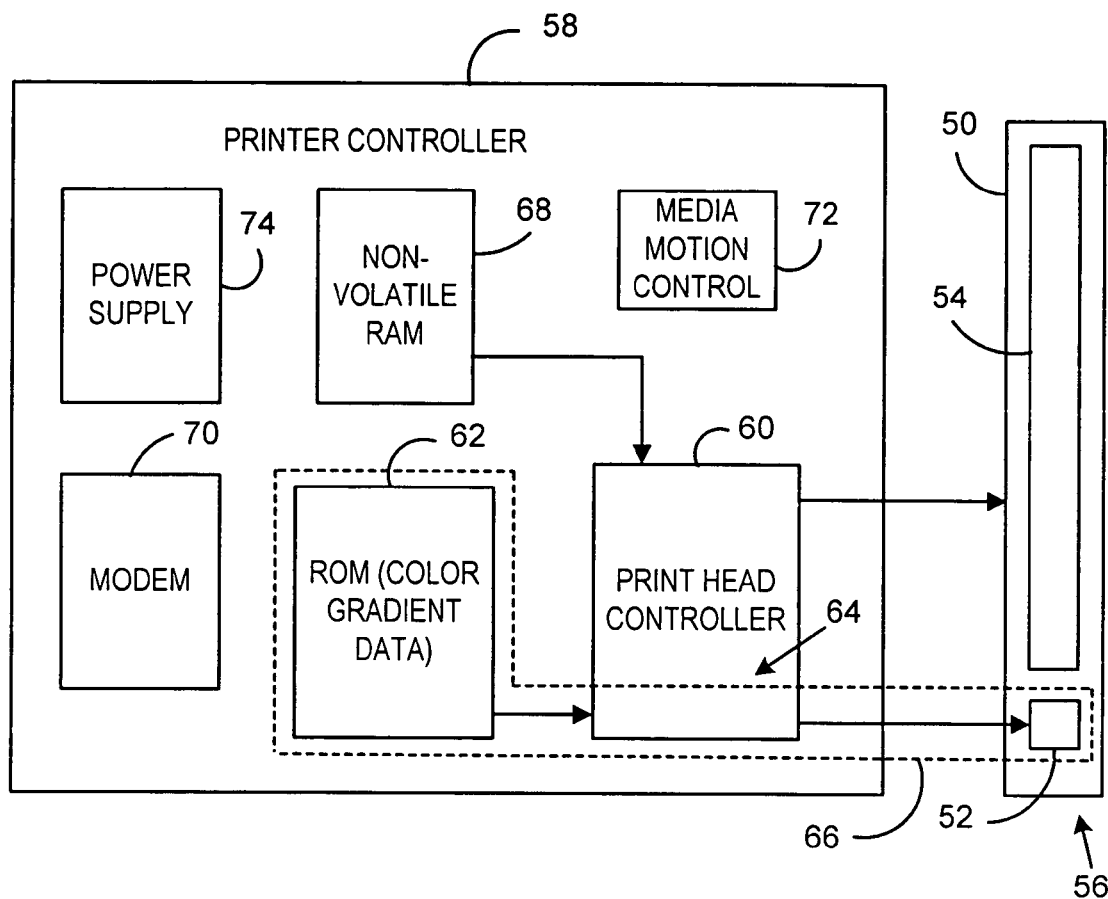
FIG. 3 is a block diagram that illustrates a postage stamp printer that is part of the apparatus of FIG. 1.

FIG. 3 is a block diagram that illustrates an embodiment of the printer 12. The printer 12 includes a print head 50. The print head 50 may, for example, be a color inkjet print head, or a thermal print head of a type suitable for color direct thermal printing. The print head 50 may include a first set 52 of print elements and a second set 54 of print elements. The first set 52 of print elements may be dedicated to printing the color stripe portion of the postage indicia printed by the printer 12. The second set 54 of print elements may operate to print other portions of the postage indicia. In some embodiments, the first set 52 of print elements may consist of 16 adjoining print elements at a lower end 56 of the print head 50, and the second set 54 of print elements may consist of approximately 280 print elements, being all of the other print elements of the print head 50. In some embodiments, the print head may print at a density of about 300 dpi (dots per inch) to produce indicia having a height of about one inch.

The printer 12 also includes a printer controller 58 that is operatively coupled to the print head 50 to control the print head 50. The printer controller 58 includes a print head controller 60 which is coupled to the print head 50 and which provides the direct control of the print head 50. The print head controller 60 may be constituted by suitable processing or control circuitry and may provide general control functions for the printer 12.

The printer controller 58 may also include a ROM 62 which may store a sequence of units of authentication data. Each unit of authentication data may be used to generate a respective color stripe as part of a respective postage stamp to be printed by the printer 12. Each unit of authentication data may, for example, be a string of data bits, and may consist of as little as a few data bits. In one embodiment, each unit of authentication data may consist of around two bytes to 18 bits of data, and may be represented in the corresponding color stripe by variations along the length of the color stripe in a single color component. For example, the color stripe may include superimposed sinusoidal variations in the color component corresponding to, say, six wavelengths, with three bits encoded in each wavelength as variations in phase and/or amplitude associated with each wavelength.

A portion (indicated at 64) of the print head controller 60 may be dedicated (e.g., hard-wired) to control only the first set 52 of print elements, and to cause the print elements 52 to print only color stripes as defined by the units of authentication data stored in the ROM 62. The ROM 62 may be coupled to the dedicated portion 64 of the print head controller 60. A security perimeter 66 may be provided to prevent and/or deter (and/or to provide evidence of) tampering with the ROM 62, the dedicated portion 64 of the print head controller 60 and the print elements 52 to assure that the print elements 52 print only color stripes defined by the data in the ROM 62. Alternatively the printer controller may be capable of calculating a unit of authentication data for each postage stamp according to an algorithm from a seed value stored in ROM.

The printer controller 58 may further include a non-volatile RAM 68, which may be in communication with the print head controller 60. The RAM 68 may operate as working memory and may also store image data, to be discussed below, which is downloaded to the printer 12 from the server 14 (FIG. 1) and which may be used to control the print head 50 to print one or more postage indicium elements prescribed by the server 14. In some embodiments, RAM 68 may also function as program storage for a program to control the print head controller 60.

In addition, the printer controller 58 may include a modem 70 through which the printer 12 may engage in data communication with the server 14, a media motion control circuit 72 that controls feeding of a substrate (e.g., an item of adhesive label stock, which is not shown in FIG. 3) past the print head 50, and a power supply 74 that provides power for at least part of the printer 12. The printer controller may also have a communication port (USB, serial, parallel, etc.) for communicating with a PC.

The printer 12 may also include other components which are not indicated in FIG. 3. Such other components may include, for example, a housing, a user interface (e.g., one or more switches or buttons, a display, a touch screen, etc.), and mechanical components for transporting the stamp stock past the print head 50.

Figure 4:
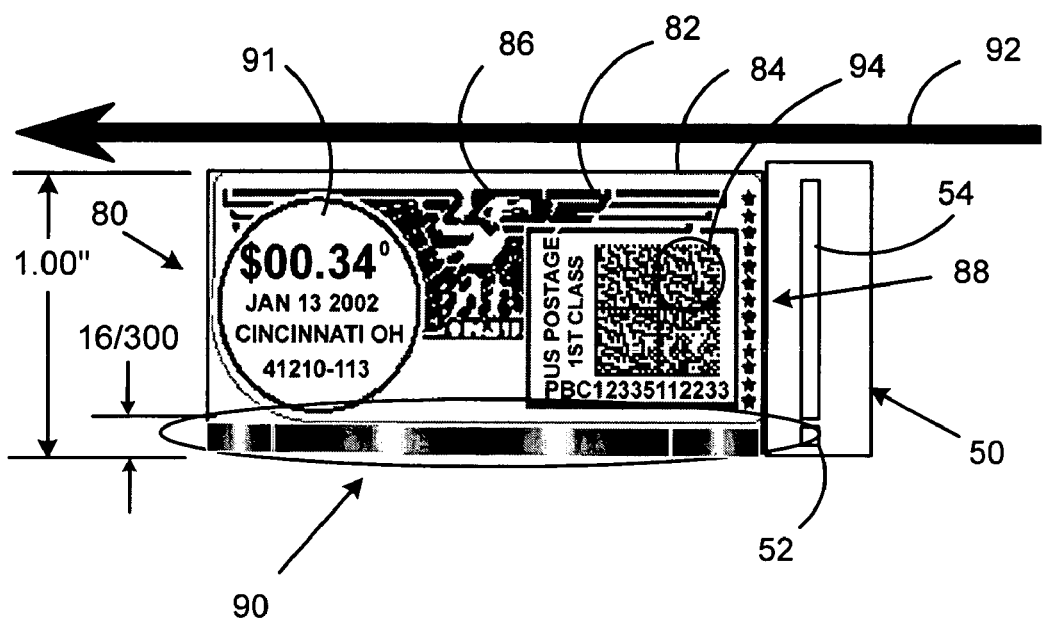
FIG. 4 illustrates a postage stamp printed in accordance with principles of the present invention, shown in juxtaposition with a print head for printing the postage stamp.

FIG. 4 illustrates a postage stamp 80 printed by the printer 12 in accordance with principles of the present invention, and shown in juxtaposition with the print head 50 of the printer 12 (the balance of printer 12 is not shown in FIG. 4). The postage stamp 80 includes a postage indicium 82 formed on a substrate 84 (e.g., adhesive label stock). In some embodiments, the substrate may be a type of stock suitable for thermal color printing.

The postage indicia 82 may include a logo 86 and a data field 88 in which machine-readable data is printed. The data field 88 may, for example, take the form of a two-dimensional barcode. Some or all of the data field 88 may be printed in accordance with the "Information-Based Indicia Program" (IBIP) promulgated by the U.S. Postal Service. The IBIP information may contain high-density variable cryptographically protected information in a two-dimensional barcode. The IBIP information may be used for security and marketing purposes. As will be seen, the data field 88 may also include data provided for security purposes (stamp authenticity verification purposes) in accordance with the principles of the present invention.

The postage indicium 82 also includes a color stripe 90, printed in accordance with principles of the present invention. The color stripe 90 may be printed by the print elements 52 of the print head 50, so that the color stripe 90 extends along the bottom of the postage indicium 82, adjacent to the logo 86 and the data field 88. The logo 86 and the data field 88 are printed by the print elements 54 of the print head 50.

The postage indicium 82 also includes an alphanumeric data field 91 that may include alphanumeric information such as amount of postage, date of printing/mailing and location/zip code of mailing.

The postage indicium 82 is shown in FIG. 4 in juxtaposition with the print head 50. The arrow mark 92 is indicative of the direction in which the substrate 84 is moved past the print head 50 to allow the first set 52 of print elements to print the color stripe 90 while the second set of print elements 54 print other portions of the indicia 82 such as the data field 88 and the logo 86. Thus the color stripe 90 and the data field 88 may be printed simultaneously or substantially simultaneously.

As will be further discussed below, the data field 88 represents authentication data that is also represented by the color stripe 90. That authentication data may, for example, be presented at a predetermined part (indicated at 94) of the data field 88.

It should be understood that the indicia 82 may include other elements, which are not shown, and which may include one or more finder or reference marks, to aid in subsequent scanning and parsing of the indicia 82. In addition to or instead of representing the authentication data in a 2D barcode, the authentication data may be represented in other ways, such as a one-dimensional barcode, and/or alphanumeric characters that are machine- and/or human-readable. The 2D barcode may be omitted.

Figure 5:
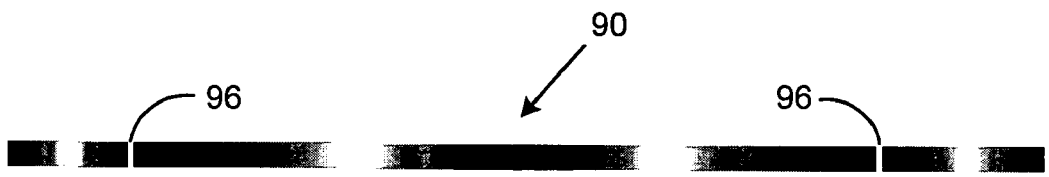
FIG. 5 shows on a larger scale a color stripe that is part of the postage stamp of FIG. 4.

FIG. 5 shows the color stripe 90 in isolation, and on a larger scale than in FIG. 4. (Because of the limitations of reproduction of drawings in patent publications, the color stripe is not in actuality shown in color.) The color stripe may include gaps 96, each near a respective end of the color stripe. The gaps 96 may be used during subsequent analysis of the color stripe as reference points. In other embodiments, the gaps 96 may be omitted, or may be supplemented or replaced by other reference marks, which are not shown.

In some embodiments, one or more color components of the color stripe 90 may exhibit variations or gradients along the length of color stripe 90 to represent authentication data. In some embodiments, the variations may be continuous and/or periodic, such as sinusoidal variations. In some embodiments, sinusoidal variations of one color component may be superimposed upon each other.

In some embodiments, a linear gradient or linear gradients in a color component may be exhibited along at least a portion of the length of the color stripe. The slope of the gradient in such a case may be employed to represent authentication data.

In some embodiments, a variation in color component along at least a portion of the length of the color stripe may take the form of a sinusoid impressed on a linear gradient. In such a case, one or more of the slope of the linear gradient, and the wavelength, amplitude and phase of the sinusoid may be used to represent authentication data.

It should be understood that the appearance of the color stripe and the authentication data represented thereby, may vary from indicium to indicium, and from embodiment to embodiment.

Figure 6:
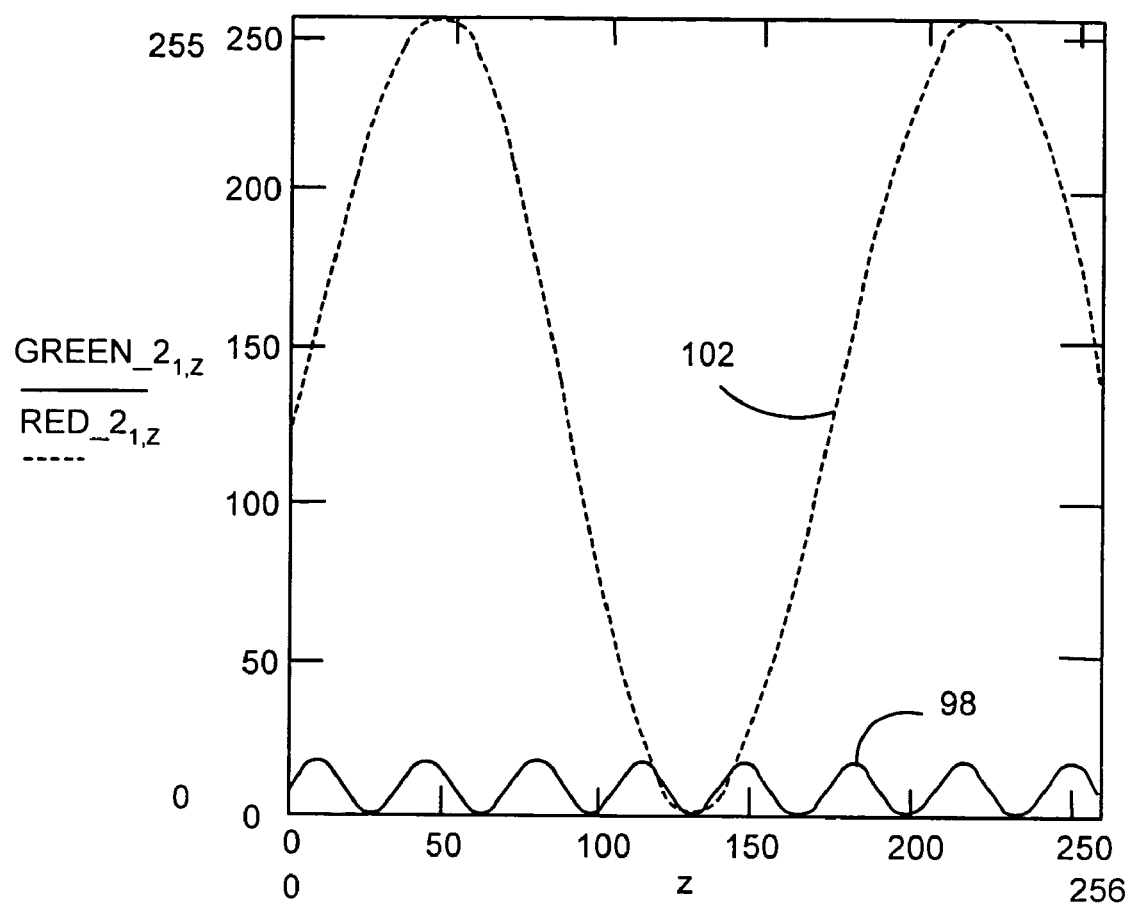
FIG. 6 is a graph that illustrates variations in two color components along the length of the color stripe of FIG. 5.

FIG. 6 graphically illustrates an example of variations in intensity in two color components that may be implemented in a particular color stripe in some embodiments. In FIG. 6, the horizontal axis represents displacement along the length of the color stripe, and the vertical axis represents variation in color intensity. The solid-line curve 98 represents variation in a green color component, and the dashed-line curve 102 represents variation in a red color component. It will be observed that both red and green color component variations are sinusoidal along the length of the color stripe. The red color component variation is a relatively large amplitude, large wavelength variation, that may be readily visible to the naked eye. The green color component variation is a relatively low amplitude, small wavelength variation, that may not be readily visible to the naked eye. The authentication data, in this example, may be represented by one or more of phase, amplitude and wave-length of either or both of the red and green color component variations. The low amplitude, small wavelength green variation may be particularly difficult to counterfeit.

Figure 7:
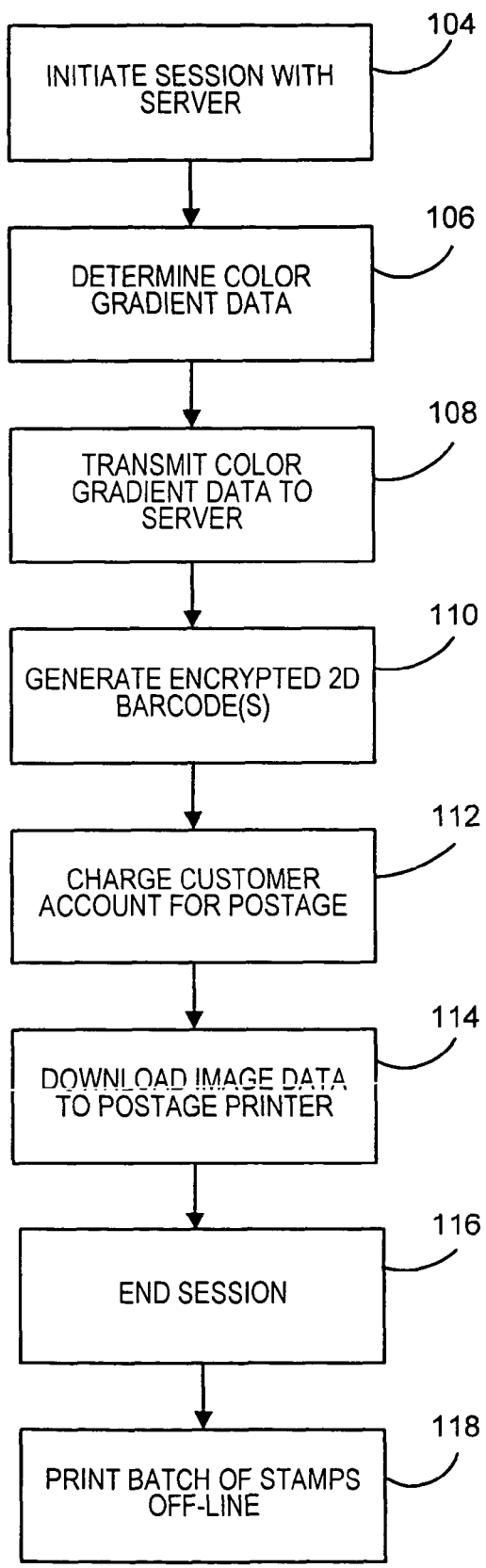
FIG. 7 is a flow chart that illustrates a process that may be performed by the apparatus of FIG. 1.

FIG. 7 is a flow chart that illustrates a process by which one or more postage stamps, like the stamp 80 shown in FIG. 4, may be printed in accordance with principles of the present invention. The process illustrated in FIG. 7 includes process steps performed by the postage indicia printer 12 or by the administrative server 14, or by the printer 12 and the server 14 operating in cooperation with each other. Accordingly, FIG. 7 is illustrative of software processes that control the printer 12 and the server 14 in accordance with principles of the present invention. The process illustrated in FIG. 7 includes process steps performed by the postage stamp printing apparatus 10. These steps are performed by the printer 12 and the administrative server 14. The preferred division of the steps is described in the following.

Initially in the process of FIG. 5 is step 104, at which the postage indicia printer 12 (FIGS. 1 and 3) initiates a data communication session with the administrative server 14 (FIGS. 1 and 2). This may be done, for example, by the postage indicia printer 12 dialing up the server 14 and engaging in a handshaking procedure with the server 14. The purpose of the communication session is to obtain authorization from the server 14 for the printer 12 to print one or more stamps, and also for the printer 12 to receive from the server 14 data to be used in printing the stamps. (In an alternative embodiment, the printer may receive the data to be used in printing the stamps via a connection to a PC and the Internet.)

Next in the process of FIG. 7 is step 106, which in some embodiments may precede, or may occur simultaneously with, step 104. At step 106, the printer 12 determines a series of units of authentication data to be represented in the color stripes in respective stamps for which authorization is to be received from the server 14. In some embodiments, the printer 12 may determine the number of stamps for which authorization is to be requested. This number of stamps (as well as the denominations of the stamps, e.g.) may be determined based on input from a user of the printer 12. The printer 12 (for example, by operation of the print head controller 60, FIG. 3) may then refer to units of authentication data in the ROM 62 on the basis of an index value stored in the RAM 68. The index value may point to an address in the ROM 62 which contains the first of the units of authentication data. In other embodiments, the ROM 62 may be omitted, and the printer 12 may generate the authentication data by a random process, or by a pseudo-random process that uses the serial number of the printer 12 as an input. In other embodiments, the user may request a number of stamps of various denominations through an Internet web service linked to the administrative server 14.

In any event, at step 108 the printer 12 transmits to the server 14 the authentication data to be included in the stamps for which authorization is being requested. This may be done, in part, by reading out authentication data from the ROM 62 based on the index value referred to above. After reading out the authentication data and transmitting the authentication data to the server 14, the index value may be updated to point to the next address in the ROM 62 after the locations at which the transmitted authentication data was stored.

At step 110, the server 14 generates image data that represents the data fields 88 of the stamps now being authorized by the server 14 for printing by the printer 12. As part of the process step of generating the data field image data, the server 14 may encrypt the authentication data received from the printer 12 using a secret key held in the server 14 and may then encode the encrypted authentication data to include the encrypted authentication data in the data for the data field. The data field for each stamp to be printed by the printer 12 may thus represent authentication data encrypted and encoded by the server 12. In some embodiments, the authentication data may be encoded for inclusion in the data field without encrypting.

Before, after or simultaneously with step 110 is a step 112, at which the server 14 initiates a charge to the customer's account for the postage to be represented by the stamps now being authorized for printing. For example, the server 14 may transfer a suitable quantity of funds from a deposit account maintained by the holder of the printer 12 to an account for the benefit of a postal authority such as the U.S. Postal Service. In other embodiments, the server may initiate a charge to a credit card account or another type of account maintained by the holder of the printer 12 at a financial institution.

After step 110, and either before, after or simultaneously with step 112, is step 114, at which the server 14 downloads to the printer 12 the data field image data generated by the server 14 at step 110. That is, the server 14 transmits the data field image data to the printer 12, and the printer 12 (e.g., the modem 70, the print head controller 60 and the RAM 68) receives the data field image data from the server 14. The data field image data for each stamp of the batch of stamps being authorized may be stored in RAM 68 or non-volatile memory.

The downloading of data may also include image data that represents the logo 86 to be included in the stamps. In another embodiment, the image data for the logo may have been loaded into the printer 12 at the factory at which the printer 12 was manufactured. In still other embodiments, the logo may be replaced with a custom or customizable image selected by the holder of the stamp printer, and the image data for such image may be downloaded from the server to the stamp printer or pre-stored in the stamp printer.

Following step 114 is step 116, at which the data communication session between the server 14 and the printer 12 is ended.

Step 118 follows step 116 in the process illustrated in FIG. 5. At step 118, the printer 12 prints the stamps authorized by the server 14 during the session. (In other embodiments, the stamps may be printed during the session. In still other embodiments, the printer prints some stamps during the session with the server or afterward, while storing authorization and data for further stamps in non-volatile memory for later printing.) As part of printing each stamp, the first set 52 of print elements (FIGS. 3 and 4) of the print head 50 print a color stripe 90 (FIG. 4) that represents the authentication data for the stamp in question stored. It will be understood that the authentication data had been communicated to the server 14 during the session, and that the appropriate address in the ROM 62 is indicated by an index value stored in the RAM 68 or non-volatile memory. The printing of the color stripe 90 by the first set 52 of print elements may be controlled by first driver software (not separately shown) which may be stored in RAM 68 or ROM 62.

Also as part of the printing of the same stamp, the second set 54 of print elements of the print head 50 print the data field 88 of the stamp, including the authentication data represented by the color stripe 90. It will be recalled that the authentication data had been encoded by the server 14. The second set 54 of print elements 54 also prints the logo 86 and other portions of the indicium 82. The printing performed by the second set 54 of print elements may be controlled by second driver software (not separately shown) which may be stored in RAM 68 or ROM 62. Other methods of representing the authentication data could also be used in addition to or instead of the two dimensional barcode shown in FIG. 4.

It will be appreciated that the components and/or the layout of the indicium 82 may be changed. For example, the location of the color stripe 90 in the indicium 82 may be changed. The data field 88 may take a form other than a two-dimensional barcode, and the logo 86 may be omitted.

Figure 8:
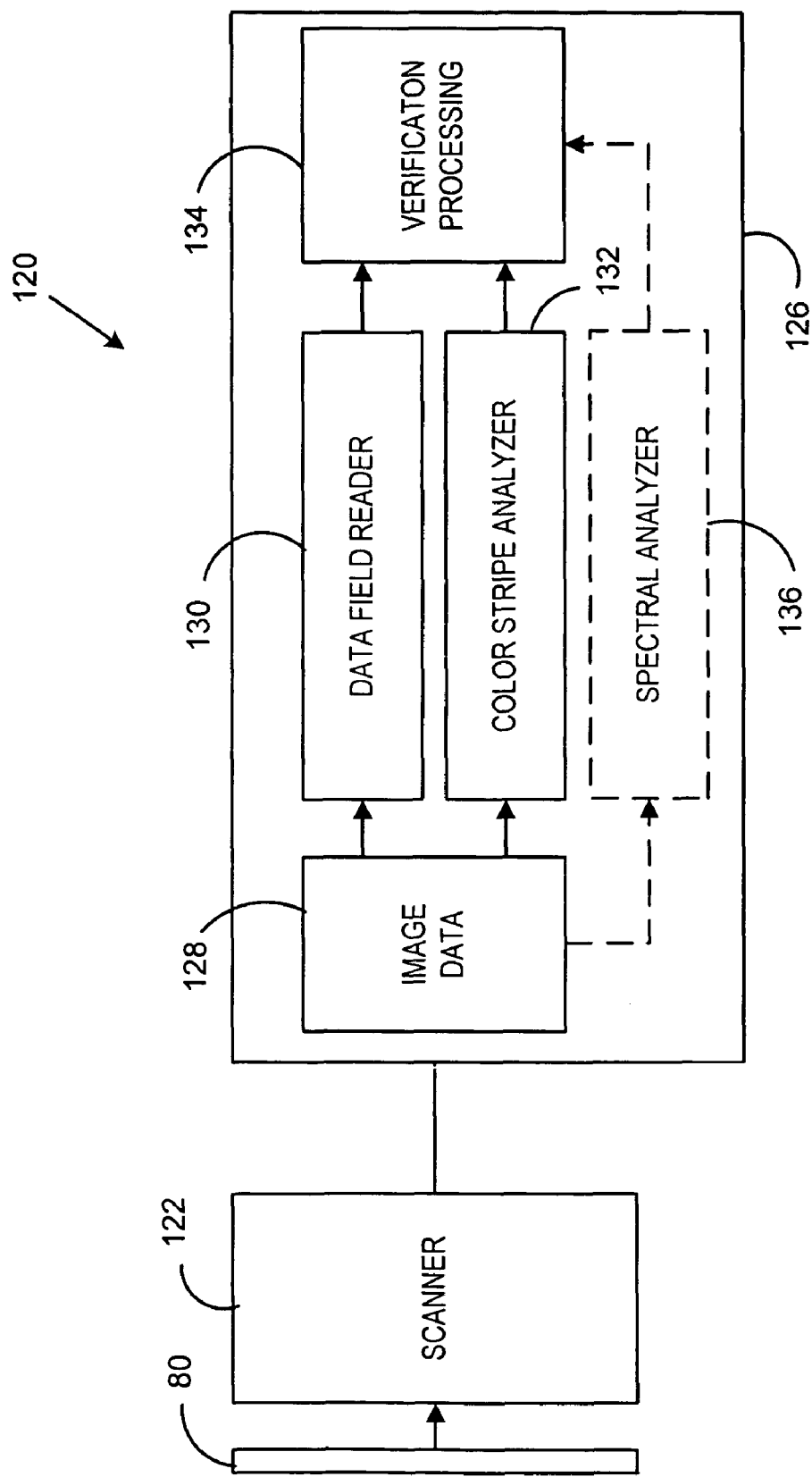
FIG. 8 is a block diagram of a device that may be provided in accordance with principles of the present invention to verify the authenticity of the postage stamp of FIG. 4.
Figure 9:
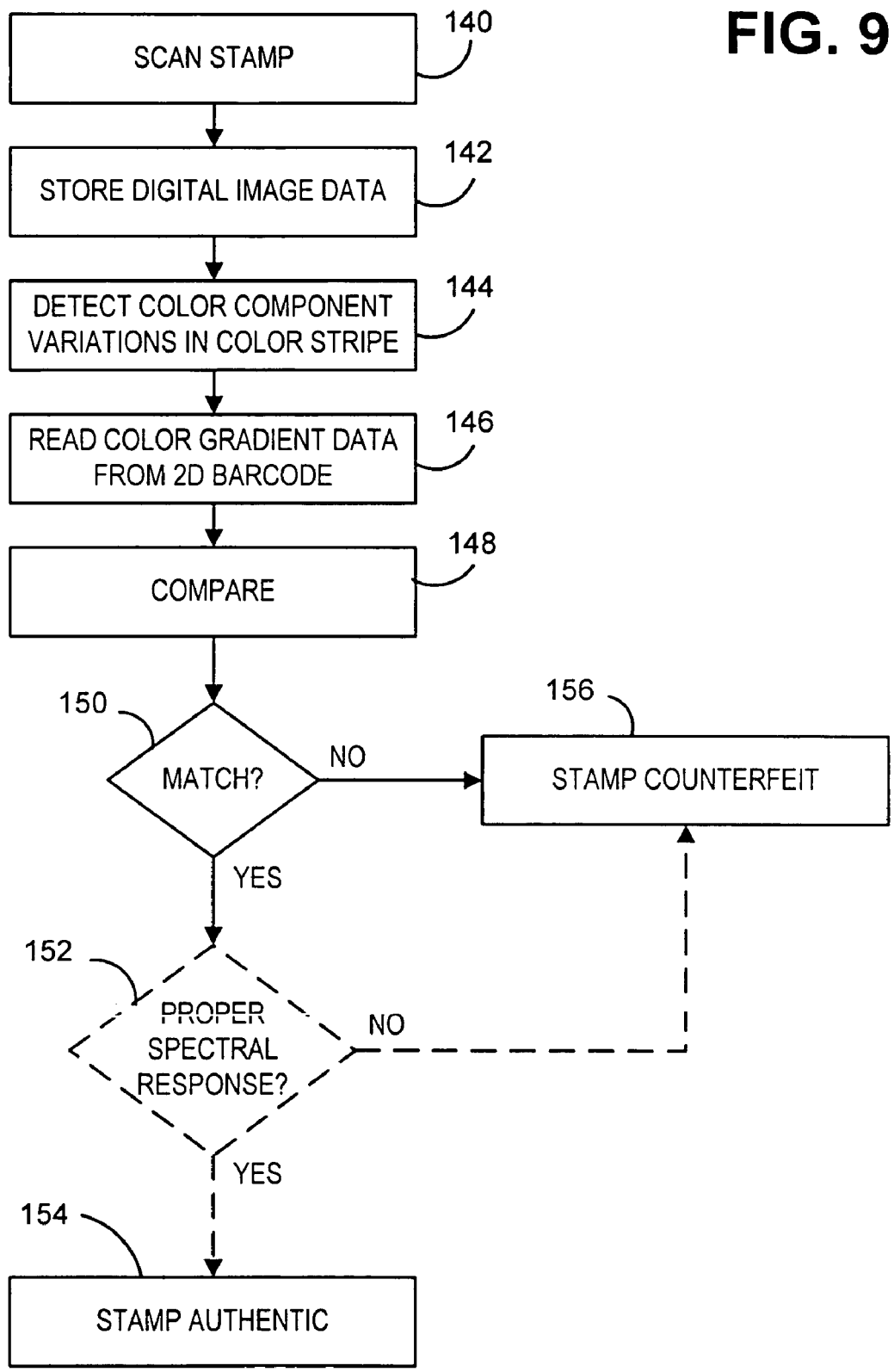
FIG. 9 is a flow chart that illustrates a process that may be performed by the verification device of FIG. 8.

FIG. 8 is a block diagram that illustrates a stamp reading and verification device 120 provided according to principles of the present invention.

The stamp verification device 120 of FIG. 6 includes a scanner 122 that is arranged to scan a postage stamp 80 to capture a color image of the indicium 82 (FIG. 4, not separately shown in FIG. 8) from the postage stamp 80. (At the time of scanning by the verification device 120, the stamp 80 may be affixed to a mail piece, which is not separately shown.) The device 120 also includes an analysis portion 126 which is coupled to the scanner 122 to receive from the scanner 122 image data which is generated by the scanner 122 and represents the image of the indicia. The image data is represented by block 128 in the analysis portion 126. The image data block 128 may comprise, for example, storage and/or preliminary analysis of the image data. The analysis portion 126 includes a data field reading (e.g., 2D barcode reading) block 130 and a color stripe analysis block 132, both of which operate on the color image data of block 128. The analysis portion 126 further includes a verification processing portion block 134 which receives data, including authentication data read from the data field 88 by the data field reading block 130 and authentication data extracted from the color stripe 90 by the color stripe analysis block 132.

In some embodiments, the stamp verification device 120 may also include a spectral analysis block 136 (shown in phantom) to determine at least one spectral characteristic of the stamp 80 on the basis of the image data from the image data block 128, and to provide a result of the spectral analysis to the verification processing portion block 134.

In some embodiments, the scanner 122 may be a conventional high-quality scanner, such as the Epson "Expression" model 1680. Image data generated by the scanner 122 may be provided in raw form to the color stripe analysis block 132 to facilitate reliable detection of color component variations by the color stripe analysis block 132. In other embodiments, the image data generated by the scanner 122 may be pre-processed by conventional driver software, such as the "VueScan" driver available from Hamrick Software, Phoenix. Ariz.

Operation of the stamp verification device 120 will now be described with reference to FIG. 7, which is a flow chart that illustrates an indicium reading and verification process performed by the device 120.

The process of FIG. 7 begins with a step 140 at which the scanner 122 scans the stamp 80. Then, at step 142, the resulting digital image data is stored in the image data block 128. At step 144, the color stripe analysis block 132 detects variations in color components along the length of color stripe 90, on the basis of the image data stored in the image data block 128, to extract authentication data from the color stripe 90.

At step 146, the data field reading block 130 reads the data field 88 (as represented in the image data stored in image data block 128) to read authentication data from the data field 88. The reading of the authentication data by the data field reading block 130 may include decrypting the authentication data. The decrypting may involve using a public key and may verify that the authentication data encoded in the data field 88 was generated by the administrative server 14 using the secret key referred to in connection with step 110 of FIG. 7.

Continuing to refer to FIG. 7, at step 148, the authentication data extracted from the color stripe by the color stripe analysis block 132 and the authentication data read from the data field 88 by the data field reading block 128 are compared by the verification processing portion block 134. A decision block 150 may follow or form part of step 148. At decision block 150, it is determined whether the authentication data extracted from the color stripe and the authentication data read from the data field match. If so (and if it is determined at decision block 152, shown in phantom, that the stamp 80 exhibits a proper spectral response for the authorized stock on which stamps are to be printed), the stamp 80 may be considered to be authenticated (step 154). If the authentication data extracted from the color stripe and the authentication data read from the data field are determined not to match (or if the stamp 80 does not exhibit the proper spectral response), the stamp 80 may be found to be counterfeit (step 156).

With a system as described herein, including printing of a color stripe in a postage indicium to form a postage stamp printed on demand by a personal postage stamp printer, along with corresponding authentication data encoded as part of a data field that is separate from the color stripe, and analyzing the color stripe and reading the data field to confirm that the authentication data from the data field matches the authentication data from the color stripe, authentication of a postage stamp that is printed on demand can be facilitated and automated, and counterfeiting of such postage stamps can be detected and deterred. Moreover, with the authentication of a postage stamp by comparing authentication data from the color stripe to authentication data in the data field, it may be the case that the stamp verification device does not require access to a central database, thereby significantly reducing the cost and increasing the convenience of the counterfeit-prevention system. With this system, it also may not be necessary to account for blank stamp printing stock. Furthermore, a color stripe as described herein may present significant technical challenges to a would-be counterfeiter.

In some embodiments, the inputs for the data field reading block 130 and the color stripe analysis block 132 need not be obtained via a shared scanner or a shared image data store. For example, data field reading and color stripe analysis may proceed in separate channels.

A stamp authentication device in accordance with some embodiments may read other data from the stamp to be authenticated in addition to the authentication data described above, and may perform other tests in addition to comparing authentication data extracted from the color stripe with authentication data read from the data field and detecting a spectral response of the stamp.

In some embodiments, a color stripe and a data field which includes corresponding authentication data may be included in an indicium printed (by a postage meter, for example) directly on a mail piece (envelope) or otherwise used for purposes other than printing a postage stamp on demand from a personal postage stamp printer. Thus, the verification process described herein may be employed to verify postage meter indicia as well as postage stamps printed on adhesive stock, with or without pictorial images as part of the postage indicia.

The order in which process steps are described herein and/or indicated in the drawings is not meant to imply a fixed order of steps, and it is contemplated that the process steps may be performed in any order that is practicable.

In some embodiments, the stamp printer may generate image data for the data field (e.g., 2D barcode) on the basis of encrypted authentication data received from the server.

A color stripe as described herein may be printed as a security element in other types of documents besides postage meter indicia or postage stamps printed on demand. Such a color stripe may be printed on substrates other than postage stamp stock or envelopes. Authentication data may also be represented by color component gradients in color fields that are not in the shape of a stripe.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. A method of incorporating authentication data into a value indicia of a mailpiece, comprising:
   (A) producing authentication data;
   (B) printing the value indicia on the mailpiece using a printer such that at least a portion of the value indicia includes a first representation of the authentication data and a second representation of the authentication data; and
   the first representation, comprising a color region, and representing the authentication data by a substantially continuous sinusoidal variation of at least one of a wavelength, amplitude, and phase variation of at least one color component of the color region.

2. The method according to claim 1, wherein the second representation comprises a barcode.

3. The method according to claim 2, wherein the barcode is a two-dimensional barcode.

4. The method according to claim 1, wherein the first and second representations are printed substantially simultaneously.

5. The method according to claim 1, wherein the color region is a linear stripe.

* * * * *